US007688176B2

(12) United States Patent
Jang et al.

(10) Patent No.: US 7,688,176 B2
(45) Date of Patent: *Mar. 30, 2010

(54) WIRELESS COMMUNICATION SYSTEM FOR ALLOCATING TRANSMISSION PERIOD

(75) Inventors: Kyung-Hun Jang, Suwon-si (KR); Jong-Ae Park, Yongin-si (KR); Dong-Jun Lee, Seoul (KR); Young-Soo Kim, Seoul (KR); Hyo-Sun Hwang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 664 days.

This patent is subject to a terminal disclaimer.

(21) Appl. No.: 11/582,759

(22) Filed: Oct. 17, 2006

(65) Prior Publication Data
US 2007/0086404 A1    Apr. 19, 2007

Related U.S. Application Data

(60) Provisional application No. 60/727,915, filed on Oct. 18, 2005, provisional application No. 60/730,924, filed on Oct. 27, 2005.

(30) Foreign Application Priority Data
Jun. 12, 2006    (KR) ...................... 10-2006-0052728

(51) Int. Cl.
    *G08C 17/00*    (2006.01)
(52) U.S. Cl. .................. 337/311; 370/318; 370/328; 370/338; 370/329; 370/341; 455/574; 455/522
(58) Field of Classification Search ................. 455/458, 455/450, 454, 509–517, 522, 69, 574; 370/574, 370/311, 318, 328, 338, 329, 341
See application file for complete search history.

(56) References Cited

U.S. PATENT DOCUMENTS 5,384,777 A * 1/1995 Ahmadi et al. .............. 370/337

(Continued)

FOREIGN PATENT DOCUMENTS

JP    2002-271340    9/2002

(Continued)

OTHER PUBLICATIONS

IEEE 802.11-04-0918-00-000n, Jang et al., "Samsung MAC Proposal Technical Specification," pp. 1-37, Revision D4.0 dated Aug. 13, 2004, I.E.E.E., XP-002420421, URL: http://www.ieee802.org/11/search/.

(Continued)

*Primary Examiner*—Kamran Afshar
*Assistant Examiner*—Marisol Fahnert
(74) *Attorney, Agent, or Firm*—NSIP Law (57) ABSTRACT

A system is provided for allocating a transmission period in a wireless network system. An access point (AP) transmits a PSMP frame indicating a downlink period and an uplink period allocated to each station (STA), and at least one sub PSMP frame indicating an allocated downlink period for at least one of a retransmission of downlink data and a transmission of an ACK indicating successful receipt of uplink data. After exchanging data with the AP in the downlink and uplink periods indicated by the PSMP frame, an STA receives the each sub PSMP frame, and performs at least one of a reception of the retransmitted downlink data and a reception of the ACK in the downlink period indicated by the each sub MAP frame.

13 Claims, 8 Drawing Sheets

U.S. PATENT DOCUMENTS

| | | | |
|---|---|---|---|
| 5,717,689 A * | 2/1998 | Ayanoglu | 370/349 |
| 6,141,336 A | 10/2000 | Bauchot et al. | |
| 7,043,477 B2 * | 5/2006 | Mercer et al. | 707/7 |
| 2003/0048765 A1 | 3/2003 | Jang | |
| 2003/0169708 A1 * | 9/2003 | Harris | 370/335 |
| 2005/0018624 A1 * | 1/2005 | Meier et al. | 370/318 |
| 2005/0135302 A1 * | 6/2005 | Wang et al. | 370/329 |
| 2005/0226198 A1 * | 10/2005 | Barak et al. | 370/345 |
| 2006/0165036 A1 * | 7/2006 | Chandra et al. | 370/329 |
| 2006/0285517 A1 * | 12/2006 | Kakani | 370/329 |
| 2007/0161364 A1 * | 7/2007 | Surineni et al. | 455/343.4 |
| 2008/0075080 A1 * | 3/2008 | Katabi et al. | 370/392 |

FOREIGN PATENT DOCUMENTS

| | | |
|---|---|---|
| WO | WO 2006/134472 | 12/2006 |

OTHER PUBLICATIONS

Perez-Costa et al., "APSM: Bounding the Downlink Delay for 802.11 Power Save Mode," pp. 3616-3622, 2005, 2005 IEEE International Conference on Seoul, Korea May 16-25, 2005, Piscataway, NY, USA, IEEE, May 16, 2005, XP-010825928.

Myers et al., "Design Considerations for Minimal-Power Wireless Spread Spectrum Circuits and Systems," pp. 1598-1612, 2000, Proceedings of the IEEE, IEEE New York, US, vol. 88, No. 10, Oct. 2000, XP-011044436.

Kyunghun Jang et al., Samsung MAC Proposal Technical Specification, Aug. 13, 2004.

Brent A. Myers et al., Design Considerations for Minimal-Power Wireless Spread Spectrum Circuits and Systems, Proceedings of the IEEE, vol. 88, No. 10, Oct. 2000.

Perez-Costa et al., APSM: Bounding the Downlink Delay for 802.11 Power Save Mode, 2005.

U.S. Appl. No. 11/582,005, filed Oct. 2006, Jang et al.
U.S. Appl. No. 11/582,495, filed Oct. 2006, Jang et al.
U.S. Appl. No. 11/581,941, filed Oct. 2006, Jang et al.
U.S. Appl. No. 11/581,283, filed Oct. 2006, Jang et al.
U.S. Appl. No. 11/581,279, filed Oct. 2006, Jang et al.
U.S. Appl. No. 11/581,671, filed Oct. 2006, Jang et al.
U.S. Appl. No. 11/582,171, filed Oct. 2006, Jang et al.
U.S. Appl. No. 11/582,723, filed Oct. 2006, Jang et al.
U.S. Appl. No. 11/582,918, filed Oct. 2006, Jang et al.
U.S. Appl. No. 11/581,913, filed Oct. 2006, Jang et al.
U.S. Appl. No. 11/582,692, filed Oct. 2006, Jang et al.
U.S. Appl. No. 11/582,169, filed Oct. 2006, Jang et al.
U.S. Appl. No. 11/582,757, filed Oct. 2006, Jang et al.
U.S. Appl. No. 11/581,496, filed Oct. 2006, Jang et al.

* cited by examiner

WIRELESS COMMUNICATION SYSTEM FOR ALLOCATING TRANSMISSION PERIOD

PRIORITY

This application claims the benefit under 35 U.S.C. §119(a) of an application entitled "Phase Resource Allocation Method" filed in the United States Patent and Trademark Office on Oct. 18, 2005 and assigned Ser. No. 60/727,915, an application entitled "Multi-Phase Resource Allocation Method" filed in the United States Patent and Trademark Office on Oct. 27, 2005 and assigned Ser. No. 60/730,924, and application entitled "Method and Apparatus for Allocating Transmission Period in a Wireless Communication System, and System Therefor" filed in the Korea Intellectual Property Office on Jun. 12, 2006 and assigned Ser. No. 2006-52728, the entire contents of all of which are incorporated herein by reference.

BACKGROUND OF THE INVENTION

1. Field of the Invention

The present invention relates generally to a wireless communication system, and in particular, to a system for efficiently allocating a transmission period in a transmission frame period of a wireless network system.

2. Description of the Related Art

Along with the recent development of wireless communication technology and the resulting spread of wireless equipment, there is an increasing demand for high-speed, highly reliable data transmission via a wireless link. A Wireless Local Area Network (WLAN) developed to meet the demand includes stations (STAs), which are mobile data communication equipment, and an access point (AP) capable of exchanging data with the STAs. The AP and the STAs, located in the same wireless service coverage area, are known as a Base Service Set (BSS).

Particularly, an improved WLAN system achieves high throughput by employing a Multiple Input Multiple Output (MIMO) technology that uses a plurality of transmission antennas and a plurality of reception antennas, and an Orthogonal Frequency Division Multiplexing (OFDM) technology. In this WLAN system, STAs located in one wireless service coverage area transmit or receive data using wireless resources allocated from an AP. The AP allocates the wireless resources in the form of phase resources, and the term "phase resources" as used herein refers to a period in which the STAs or AP can transmit data.

Figure 1:
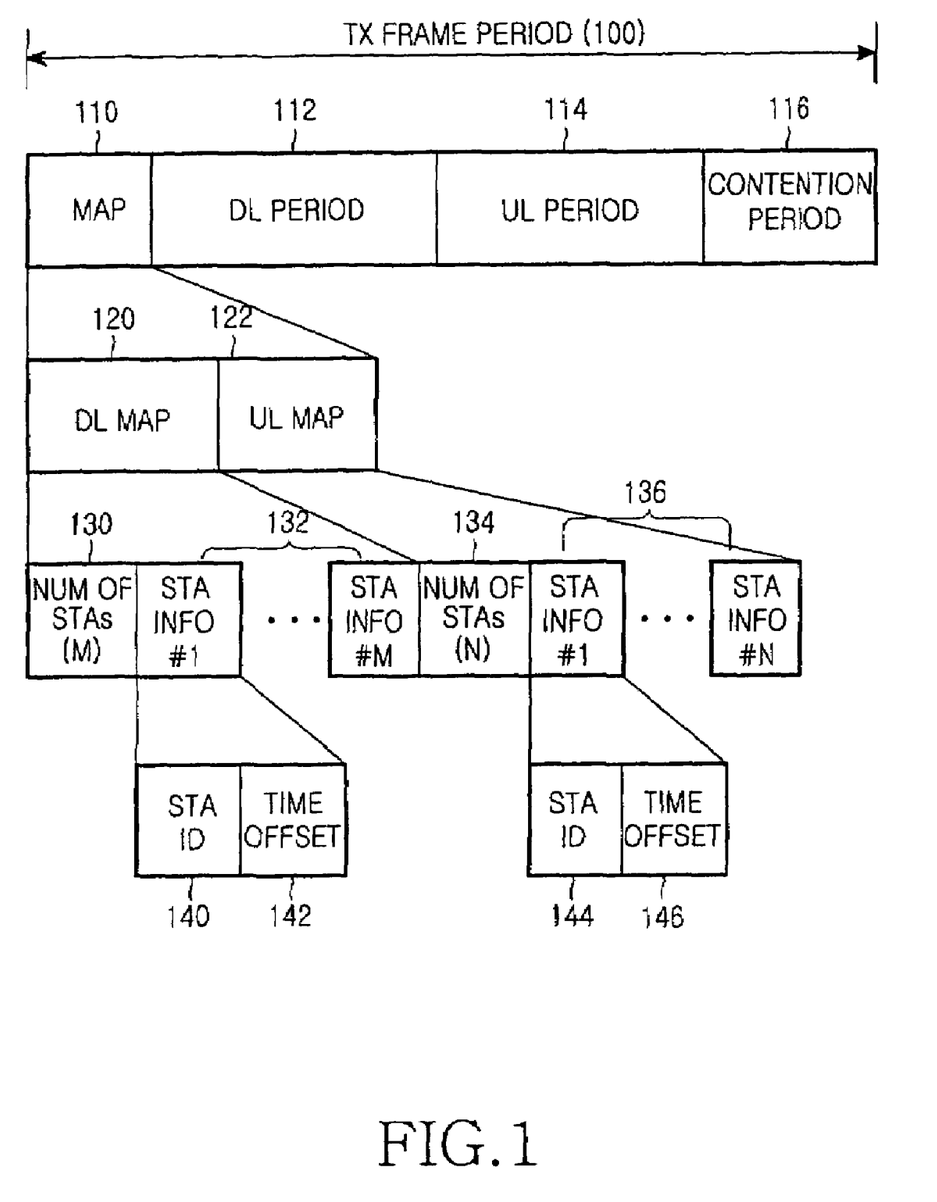
FIG. 1 illustrates a structure of a transmission frame period in a conventional WLAN system.

FIG. 1 illustrates a structure of a transmission frame period in a typical WLAN system.

Referring to FIG. 1, in a transmission frame period 100 having a fixed length determined in the system, an AP transmits a MAP (mapping) frame 110 indicating phase resource allocation over the full transmission frame period 100. The MAP frame 110 is composed of a downlink MAP 120 indicating a period in which the AP can transmit data, and an uplink MAP 122 indicating a period in which the STAs can transmit data. The downlink MAP 120 is composed of a Number-of-STAs field 130, and at least one STA Information field 132 determined based on the Number-of-STAs field 130. Similarly, the uplink MAP 122 is composed of a Number-of-STAs field 134, and at least one STA Information field 136 determined based on the Number-of-STAs field 134. The STA Information fields 132 and 136 each include STA ID fields 140 and 144 that indicate STAs allocated downlink and uplink periods, and Time Offset fields 142 and 146 that indicate time offsets allocated to the STAs.

An STA, allocated a period in the MAP frame 110, receives data in a period indicated by corresponding STA information, in a downlink period 112, and transmits data in a period indicated by corresponding STA information, in an uplink period 114. The STA maintains a sleep mode in the other periods except for the period in which the MAP frame 110 is transmitted and the period indicated by the MAP frame 110. A contention period 116 following the uplink period 114 can be accessed by an STA on a contention basis.

In this way, the AP estimates the amount of resources required for each STA in one transmission frame period 100, and allocates downlink and uplink periods according to the estimation. However, when the AP overestimates the amount of resources required for the STA, the wireless resources are wasted, decreasing data throughput performance. In this case, the STA may not use the allocated wireless resources. Moreover that resource cannot be reused by other STAs since that resource is already allocated to the particular STA. When the AP underestimates the amount of resources required for the STA, the STA cannot be allocated its required resources until at least the next transmission frame period, suffering transmission delay and jitter of the uplink service. The transmission delay and jitter affects a Quality of Service (QoS) required by the STA. In addition, if the STA accesses the contention period 116 due to a lack of its allocated resources, the STA cannot operate in the sleep mode for the contention period, wasting its power.

Therefore, in the wireless communication system in which the AP determines the downlink and uplink periods required for the STA through scheduling, there is a need for technology to prevent the reduction in data throughput and the waste of STA power, and accurately allocate the periods.

SUMMARY OF THE INVENTION

To substantially solve at least the above problems and/or disadvantages and to provide at least the advantages below, the present invention provides a transmission period allocation system for minimizing a waste of STA power without reducing data throughput in a wireless network system.

The present invention provides a system for flexibly allocating a transmission period required for an STA using more than two MAP frames in a wireless network system.

The present invention provides a system for, after allocating a transmission period to an STA using a MAP frame, allocating periods required for error recovery of downlink and/or uplink data to the STA using an additional MAP frame in a wireless network system According to one aspect of the present invention, there is provided a wireless network system including an access point (AP) for transmitting in the transmission frame period a power save multi-poll (PSMP) frame providing an initial downlink period and an initial uplink period to each station (STA), and a sub PSMP frame providing an additional downlink period for a retransmission of downlink data and; and an STA for transmitting in the transmission frame period data by the AP in the initial downlink period and receiving data by the AP in the initial uplink period, and receiving the retransmission of the downlink data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

A main feature of the present invention, related to allocation of transmission periods in a wireless network system, is to provide more than one MAP (mapping) frames to indicate downlink and uplink periods allocated by an access point (AP) to each station (STA) in a transmission frame period. The allocated period starts immediately after the corresponding MAP frame is transmitted, and in the transmission frame period, the MAP frames other than the first MAP frame are called "subsequent MAPs (sub MAPs)." The sub MAP frame is used for error recovery of downlink and uplink data. Herein, the error recovery includes retransmission for the data transmitted on the downlink, and transmission of Acknowledge (ACK) for the data received on the uplink, and can encompass other error recovery schemes.

Although a detailed description of the present invention will be made with reference to a Wireless Local Area Network (WLAN) system based on IEEE 802.11 standards, it will be understood by those skilled in the art that allocation of phase resources, a basic aspect of the present invention, can also be applied to other wireless communication systems having the similar technical requirements and channel formats without departing from the spirit and scope of the invention.

Figure 2A:
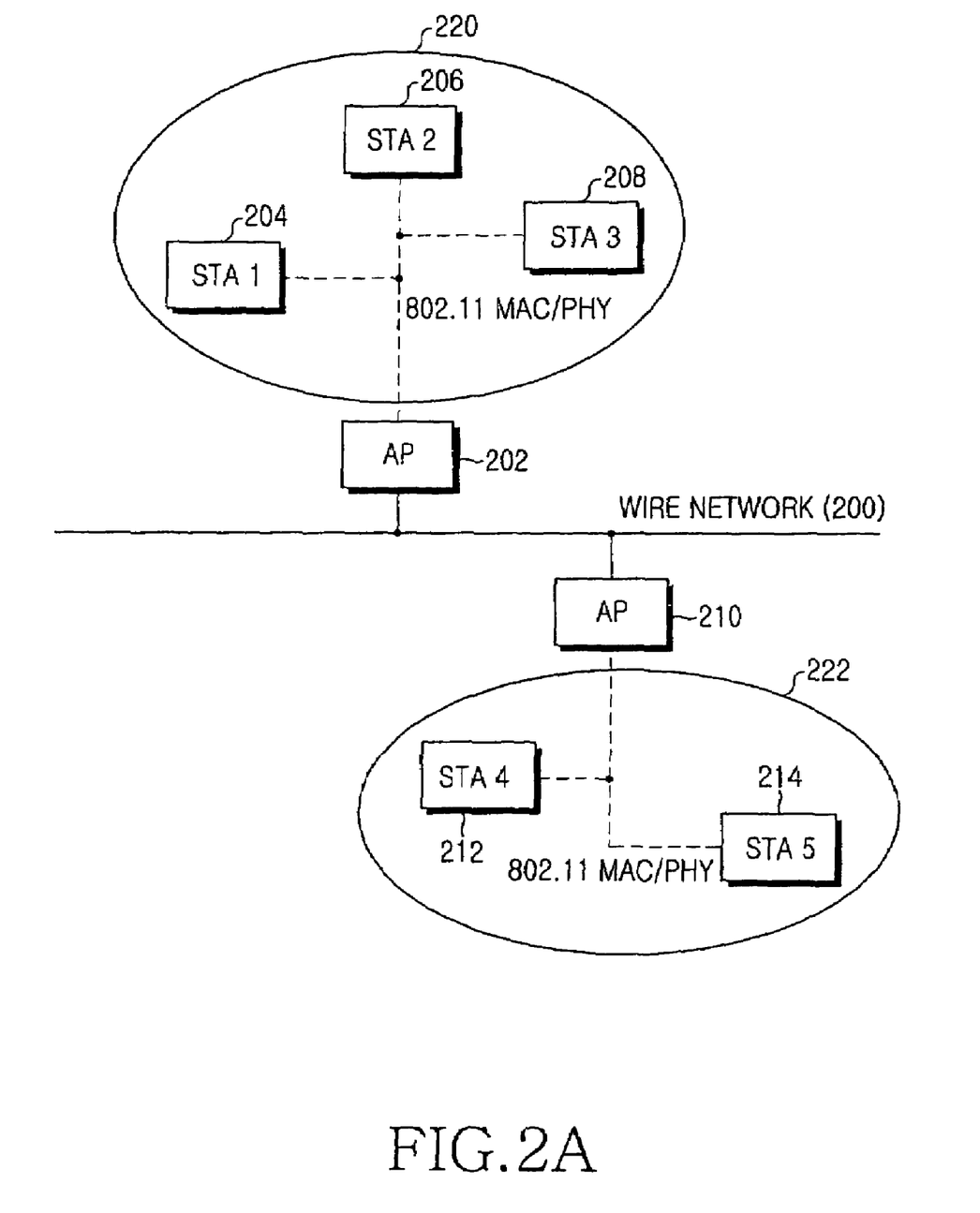
FIG. 2A illustrates a configuration of a WLAN system according to the present invention.

FIG. 2A illustrates a configuration of a WLAN system according to the present invention.

Referring to FIG. 2A, each of APs 202 and 210 is connected to a wire network 200, and a plurality of STAs 204, 206, 208, 212 and 214 access their associated APs 202 and 210 via an IEEE 802.11 Physical (PHY) layer and a wireless link based on a Media Access Control (MAC) protocol, and transmit and receive data over a plurality of wireless channels. The STAs 204 to 208 and the AP 202, located in the same wireless service coverage 220, constitute one Base Service Set (BSS). The STAs 212 and 214 and the AP 210, located in the wireless service coverage 222, form another BSS. STAs located in each BSS can exchange data with each other via a corresponding AP. Key functions of the APs 202 and 210 include delivery of data traffic, access to other networks (e.g. wire network 200), roaming support, synchronization in a BSS, power management support, and control of media access for supporting time-bound service in a BSS.

Figure 2B:
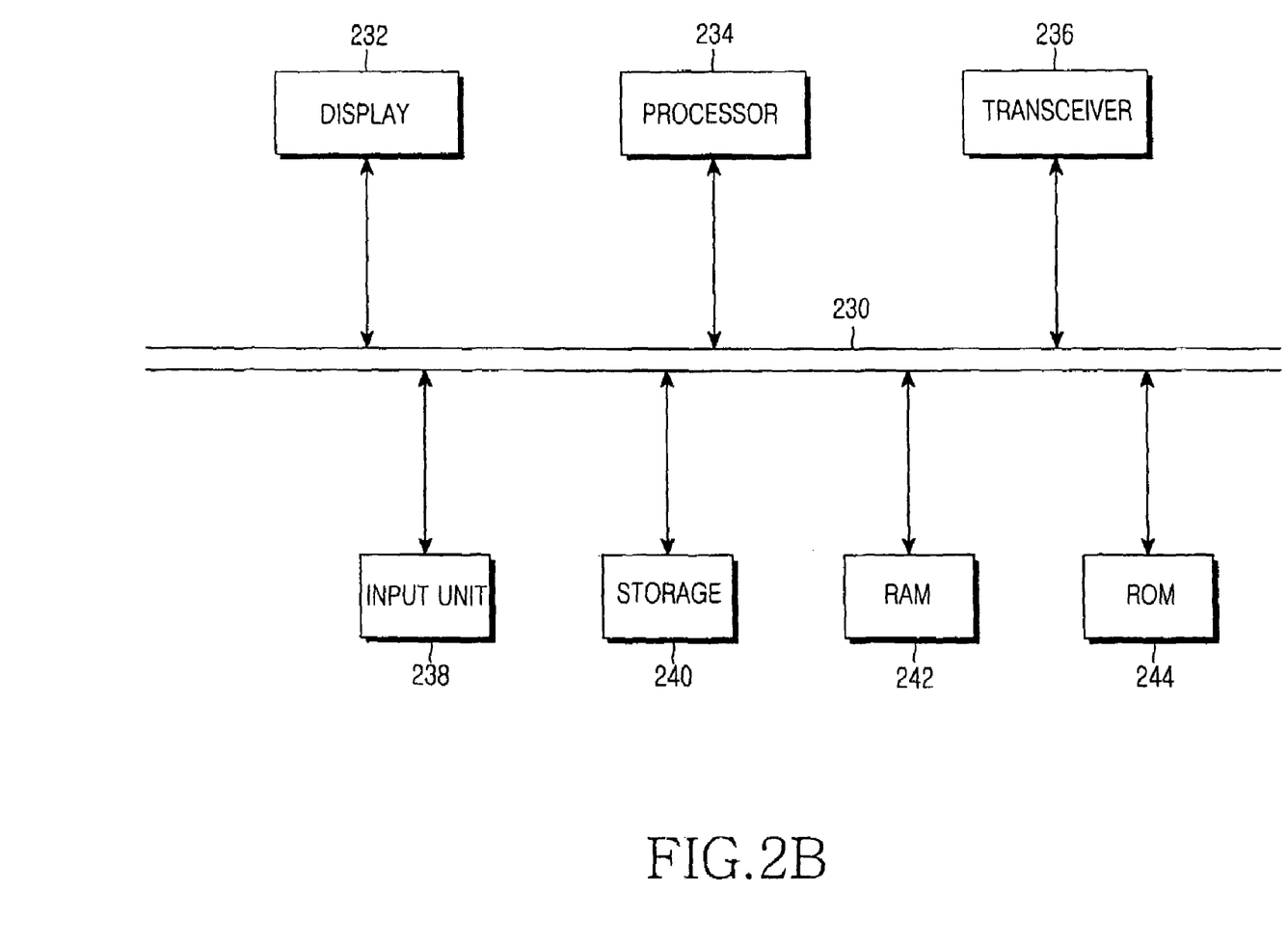
FIG. 2B is a block diagram illustrating an exemplary structure of an AP and each STA in the WLAN system shown in FIG. 2A.

FIG. 2B is a block diagram illustrating an exemplary structure of an AP and each STA in the WLAN system shown in FIG. 2A. Both of the AP and the STA can include a display 232, a processor 234, a transceiver 236, an input unit 238, a storage 240, a Random Access Memory (RAM) 242, a Read Only Memory (ROM) 244, and a common bus 230. The illustrated exemplary structure is merely provided for convenience. Although specific elements and their operations as an AP or an STA will be described herein with reference to FIG. 2B, the exemplary description should not limit the present invention.

Referring to FIG. 2B, the transceiver 236, connected to an antenna (not shown), receives data and converts the received signal into corresponding digital data. The processor 234 is a controller operating under the control of an operating system (OS) and other programs, included in the ROM 244, and the data and information generated by the processor 234 is stored in the RAM 242.

Key operations of the processor 234 included in the AP include generation and analysis of data, allocation of periods for the STAs located in the same wireless service coverage area and connected to the AP, generation of at least one MAP frame that indicates the allocated period, and operation mode control for the transceiver 236 based on the allocated period. Specifically, the processor 234 of the AP or provides allocates initial resources $R_{init}$ to the STAs through the MAP frame located in the foremost part of a transmission frame. If there is a need to receive an ACK from an STA or to transmit retransmission data to the STA, the processor 234 additionally allocates the remaining periods in the transmission frame period to the corresponding STA, through the sub MAP frame transmitted immediately after the expiration of a sequence duration associated with the first MAP frame of the transmission frame. It would be obvious to those skilled in the art that the term "immediately after" substantially refers to a lapse of a predetermined time.

After expiration of the downlink/uplink period indicated by the first MAP frame, if necessary, more than one sub MAP frames indicating the downlink and/or uplink periods allocated in the same transmission frame period can be additionally transmitted. The sub MAP frame is followed by the downlink and/or uplink periods indicated by the sub MAP frame.

Key operations of the processor 234 included in the STA include generation and analysis of data, generation of a transmission frame, and operation mode control for the transceiver 236 based on a MAP frame received from the start point of the transmission frame. The processor 234 controls the transceiver 236 such that it receives the MAP frame from the AP at the start point of every transmission frame, and analyzes the MAP frame to determine whether its own STA ID is included therein. If its own STA ID is included in the MAP frame, the processor 234 stores in the storage 240 information on the allocated downlink and uplink periods indicated by the STA information associated with the STA ID, and then wakes up the receiver and the transmitter of the transceiver 236 in the downlink and uplink periods, respectively, so as to receive and/or transmit data. The receiver and the transmitter of the transceiver 236 enter the sleep mode in the other periods except for the allocated periods.

If there is an error in the data received from the AP, or if the STA is to receive an ACK for the data transmitted to the AP, the processor 234 of the STA monitors whether a sub MAP frame indicating the resources additionally allocated for error recovery is received from the AP immediately after expiration of the full period indicated by the MAP frame, and upon receipt of the sub MAP frame, analyzes the received sub MAP frame. The full period includes all of the periods provided by the MAP frame.

According to the present invention, the data transmitted in the downlink period indicated by the MAP frame is acknowledged by an ACK in the following uplink period. The data transmitted in the downlink period indicated by the sub MAP frame is acknowledged by an ACK in the uplink period additionally allocated depending on the following sub MAP frame. In this case, the downlink and uplink data that requires retransmission can be retransmitted in the period allocated depending on the following sub MAP frame.

The WLAN system, like the common wireless communication system, has the possibility that errors will occur in the transmitted data due to multi-path fading, inter-STA interference, and noise. To solve this problem, there have been proposed an Automatic Repeat Request (ARQ) and Hybrid ARQ (H-ARQ) schemes in which a receiver sends a retransmission request for failed data to a transmitter. In these schemes, the receiver uses an ACK to inform the transmitter whether there is an error in the received data. Upon receipt of the ACK, the transmitter determines that the receiver has succeeded in receiving the corresponding data (i.e. acknowledged data). However, upon failure to receive the ACK, the transmitter determines that the receiver has failed in receiving the corresponding data (i.e. unacknowledged data). Therefore, upon failure to receive a desired ACK, the transmitter retransmits all unacknowledged data.

The ARQ and H-ARQ schemes can use not only the general ACK with which the transmitter can be notified of the success/failure in data reception for individual packetized transmission data, but also a block ACK. In the block ACK scheme, the transmitter continuously transmits a plurality of packets, and then, is collectively notified through a block ACK whether the receiver has successfully received the transmitted packets.

The data transmitted/received by the STA can aggregate in one Aggressive MAC Protocol Data Unit (A-MPDU), and the A-MPDU can be transmitted for the same downlink or uplink period, along with MAC Service Data Units (MSDUs) with different Traffic Stream Identifiers (TSIDs). The block ACK represents the reception result (success/failure) for a plurality of MSDUs using a bitmap, and herein, the bitmap represents the success/failure for the MSDUs succeeding the first MSDU with '1 (success)' or '0 (failure)'. The block ACK has the format and size optimized according to the number of acknowledged MSDUs.

A simple block ACK can be composed of a sequence number of the first MSDU in which a block ACK is transmitted, and the bitmap. If necessary, Multiple TID Block Acknowledge (MTBA) including a plurality of bitmaps identified with a Traffic Identifier (TID) is used. In order to permit transmission of the block ACK having a larger size, the AP allocates uplink or downlink periods. Herein, both the block ACK and the general ACK will be referred to as an ACK.

Figure 3:
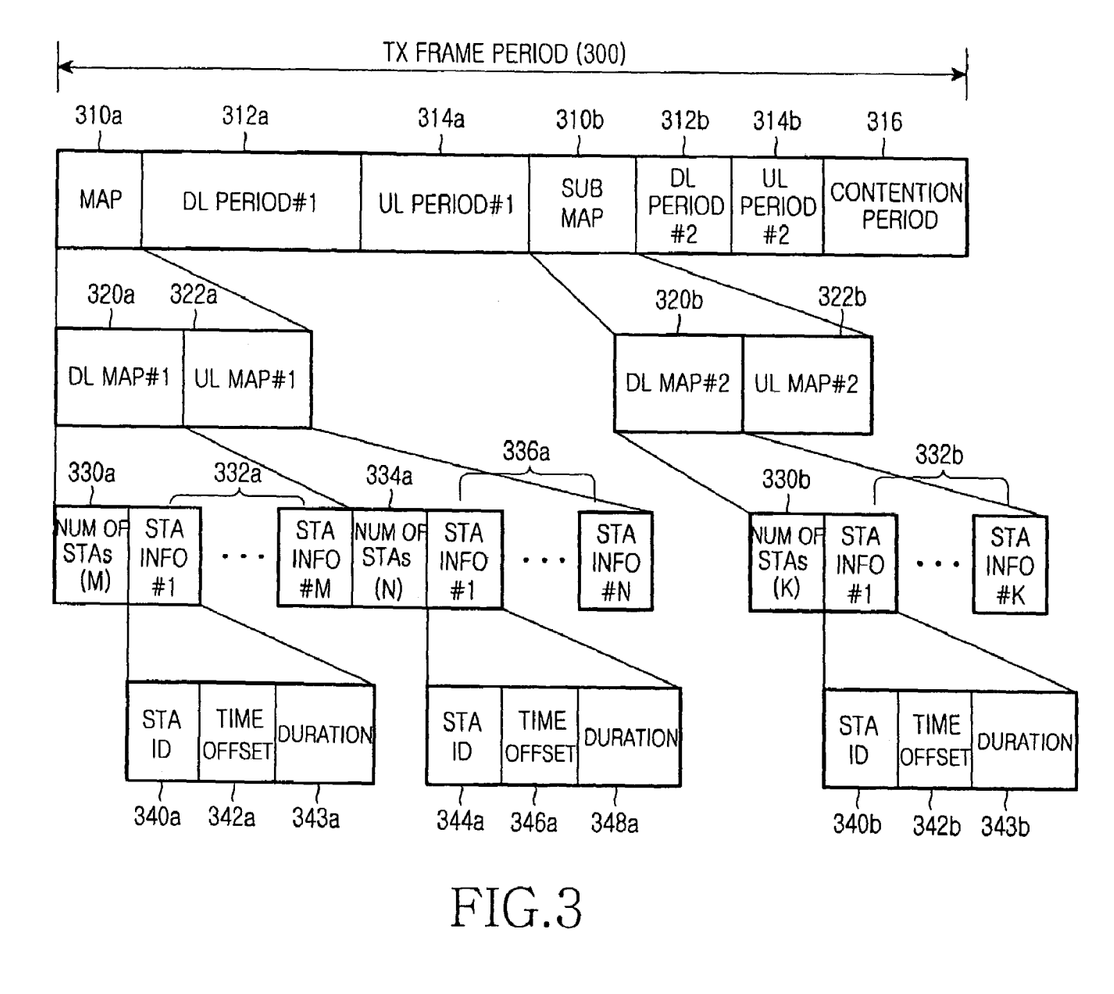
FIG. 3 illustrates a structure of a transmission frame period according to the present invention.

FIG. 3 illustrates a structure of a transmission frame period according to the present invention. Although it is illustrated herein that frames and uplink and downlink periods are adjacent to one another, intervals for transmission and reception switching and processing may exist in the actual system.

Referring to FIG. 3, in a transmission frame period 300 having a fixed length, an AP first transmits a MAP frame 310a with a basic rate set (including modulation scheme, coding rate, and data rate), which is less than a normal rate set. This is to enable all STAs in the service coverage area to receive the MAP frame 310a. At the start of the communications, the MAP frame 310a is periodically transmitted according to a fixed period (for example, about 20 ms and 100 ms for Voice over Internet Protocol (VoIP) and Moving Picture Experts Group 4 (MPEG4), respectively) determined through negotiation between the AP and the STA. The transmission frame period 300 is initialized by the transmission of the MAP frame 310a.

For example, the MAP frame 310a, in order to indicate phase resource allocation of its succeeding first downlink period 312a and first uplink period 314a, is composed of a first downlink MAP 320a that indicates a period in which the AP can transmit data in the first downlink period 312a, and a first uplink MAP 322a that indicates a period in which the STA can transmit data in the first uplink period 314a. The first downlink MAP 320a is composed of a Number-of-STAs field 330a and at least one STA Information field 332a determined based on the Number-of-STAs field 330a. In the same way, the first uplink MAP 322a is composed of a Number-of-STAs field 334a and at least one STA Information field 336a determined based on the Number-of-STAs field 334a.

The STA Information fields 332a and 336a each include STA ID fields 340a and 344a that indicate STAs allocated the periods in the first downlink period 312a and the first uplink period 314a, Time Offset fields 342a and 346a that indicate starts of the periods allocated to the STAs, and Duration fields 343a and 348a that indicate lengths of the allocated periods. The STA ID fields 340a and 344a each include at least a part of an Association Identity (AID) of each STA, or at least a part of a hardware address, i.e. MAC address, given to each STA. An STA ID indicating a period for broadcast/multicast data is set to a particular value, for example, '0'. The Time Offset fields 342a and 346a each indicate an interval from the MAP frame 310a until a start of a corresponding period in a multiple of a predetermined unit of time (for example, 4 μs). The Duration fields 343a and 348a each indicate an interval from a start to an end of the period, i.e. indicate a length of the period in a multiple of a predetermined unit of time (for example, 16 μs).

The first downlink MAP 320a and the first uplink MAP 322a of the MAP frame 310a represent downlink and uplink periods first allocated to each STA, and can be determined according to the amount of data that the AP desires to transmit and the expected amount of data that the AP will transmit. In this case, the AP determines the first uplink MAP 322a such that it includes the resources needed to send a notification of the success and failure in reception of the data transmitted in the first downlink period 314a. The STA, allocated a phase resource in the MAP frame 310a, receives data in the period indicated by the corresponding STA information 332a in the first downlink period 312a, and transmits data in the period indicated by the corresponding STA information 336a in the first uplink period 314a. The downlink and uplink data can include one or more A-MPDUs and/or MPDUs including a payload and an ACK. The STA maintains the sleep mode in the period where the MAP frame 310a is transmitted, and the other periods except for the periods indicated by the MAP frame 310a.

Each STA receives data in the allocated period of the first downlink period 312a, and determines whether there is an error in the received data, using an error correction code included in the received data. For example, each STA determines whether there is an error in each MSDU included in the A-MPDU. The determination result is transmitted in the allocated period of the first uplink period 314a in the form of an ACK, along with the uplink data. In order to re-receive the failed data received in the first downlink period 312a and to receive an ACK for the data transmitted in the first uplink period 314a, the STA monitors the receipt of a sub MAP frame 310b immediately after the expiration of all of the periods indicated by the MAP frame 310a, i.e. downlink period #1 312a and uplink period #1 314a. The STA transitions to an active mode in the allocated periods of a second downlink period 312b and a second uplink period 314b indicated by the sub MAP frame 310b.

In order to retransmit data that was transmitted with errors in the first uplink period 314a and transmit an ACK indicating the success in receipt of data received in the first uplink period 314a, the AP allocates additional resources for error recovery, i.e. the second downlink period 312b, to the STA by transmitting the sub MAP frame 310b. In this same way, the AP determines whether there is an error in the received data, using an error correction code included in the received data. If there is an error in the data received in the first downlink period 314a, the AP can allocate the second uplink period 314b to the STA through the sub MAP frame 310b in order to permit a retransmission of the data.

That is, the sub MAP frame 310b includes a second downlink MAP 320b and a second uplink MAP 322b indicating phase resource allocation for the succeeding second downlink period 312b and second uplink period 314b. The sub MAP frame could have only one of a second downlink period and a second uplink period. However, both downlink and uplink periods for each STA may or may not exist together. For example, if there is a downlink period, an uplink period might be needed for acknowledgement and visa versa. Similarly, the sub MAP frame 310b can be transmitted with the basic rate set. The second downlink MAP 320b is composed of a Number-of-STAs field 330b and at least one STA Information field 332b determined based on the Number-of-STAs field 330b. The STA Information field 332b includes an STA ID field 340b that indicates an STA allocated a period in the second downlink period 312b, a Time Offset field 342b that indicates a start of the period allocated to the STA, and a Duration field 343b that indicates a length of the allocated period. The elements of the STA Information field 332b have been described above, and the second uplink MAP 322b is equal in structure to the second downlink MAP 320b, so a detailed description thereof will be omitted. The STA, allocated phase resources by the sub MAP frame 310b, exchanges data and ACK with the AP in the periods indicated by the corresponding STA information 332b, of the second downlink period 312b and the second uplink period 314b.

Although not illustrated, if there is still an additional need for additional resource allocation, more than one sub MAP frames and an uplink period or a downlink period based on the sub MAP frames can be additionally included in the transmission frame period 300. A transmission scheme using a MAP frame capable of accompanying one or more sub frames is referred to as a Power Save Multi-Poll (PSMP) scheme, and the MAP frame 310a and the sub MAP frame 310b are referred to as a PSMP frame and a sub PSMP frame, respectively. Each of the PSMP frame and the sub PSMP frame is followed by at least one downlink or uplink period indicated by the corresponding (sub) PSMP frame, and one (sub) PSMP frame and a corresponding indicated period are referred to as a (sub) PSMP sequence. In other words, one PSMP sequence is initialized by transmitting the PSMP frame, and the STA wakes up only in the period indicated by the PSMP frame in the PSMP sequence starting with the PSMP frame, thereby minimizing power consumption.

A contention period 316 following the last sequence duration can be accessed by a STA on a contention basis.

It should be noted that elements of the MAP frame 310a and the sub MAP frame 310b shown in FIG. 3 and their arrangements are subject to change without departing from the spirit and scope of the invention. For example, the MAP frame 310a and the sub MAP frame 310b can include one STA ID field, Time Offset and Duration fields for downlink transmission, and Time Offset and Duration fields for uplink transmission. In this case, if no period is allocated to the uplink or downlink, a corresponding Duration field is set to Null (0). In addition, the MAP frame 310a and 310b the sub MAP frame can include a field for indicating whether it will be followed by a sub MAP frame or another sub MAP frame. The STA analyzes the field in the sub MAP frame to determine whether the sub MAP frame is the last sub MAP frame in the current transmission frame period.

Figure 4:
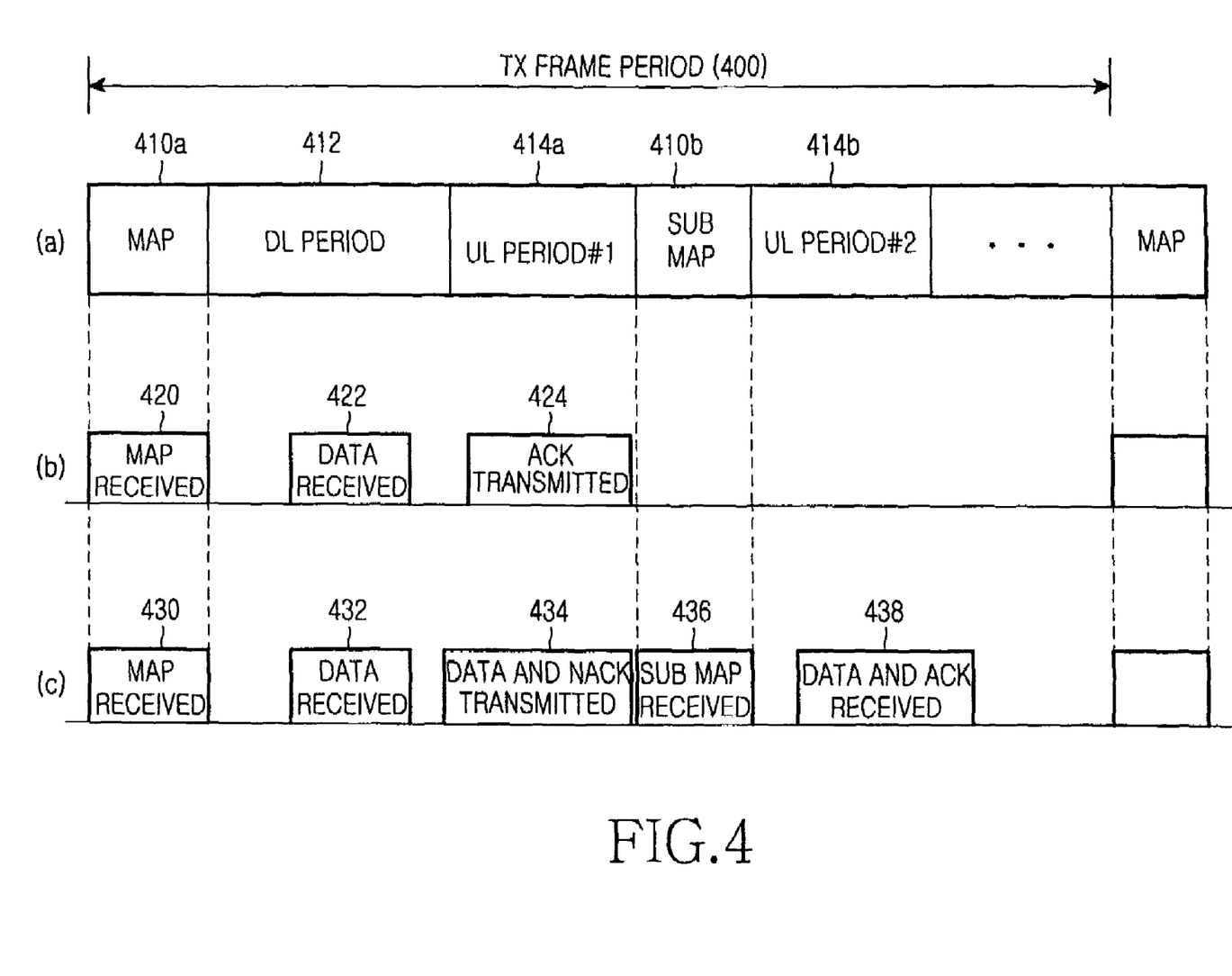
FIG. 4 is a timing diagram for a description of a power reduction effect of the phase resource allocation according to the present invention.

FIG. 4 is a timing diagram for a description of a power reduction effect of the phase resource allocation according to the present invention.

Referring to diagram (a) of FIG. 4, a transmission frame period 400 includes a MAP frame 410a, a first downlink period 412a, a first uplink period 414a, a sub MAP frame 410b, and a second downlink period 412b. The MAP frame 410a provides phase resource allocation of the first downlink period 412a and the first uplink period 414a.

Referring to diagram (b) of FIG. 4, after switching to the sleep mode after receipt of the MAP frame 410a in a period 420, the STA wakes up in an allocated period 422 in the first downlink period 412a indicated by the MAP frame 410a and receives downlink data from the AP. After switching back to the sleep mode upon expiration of the period 422, the STA maintains the sleep mode until an allocated period 424 in the first uplink period 414a indicated by the MAP frame 410a. In the period 424, the STA transmits a positive ACK for the downlink data to the AP. The positive ACK indicates that the STA has normally received all the downlink data. Here, the STA has no uplink data to transmit, so it has no need to monitor the sub MAP frame 410b, for error recovery.

Referring to diagram (c) of FIG. 4, after switching to the sleep mode after receipt of the MAP frame 410a in a period 430, the STA wakes up in an allocated period 432 in the first downlink period 412a indicated by the MAP frame 410a, and receives downlink data from the AP. After switching back to the sleep mode upon expiration of the period 432, the STA maintains the sleep mode until an allocated period 434 in the first uplink period 414a indicated by the MAP frame 410a. In the period 434, the STA transmits a negative ACK (NACK) for the downlink data to the AP, along with the uplink data. The NACK is an ACK indicating that the downlink data is damaged. For example, the NACK is a bitmap in which only the bits mapped to the damaged MSDUs are set to '0 (failure)'. Therefore, the STA monitors receipt of the sub MAP frame 410b in order to be allocated the resources for retransmission of the unacknowledged downlink data and for reception of an ACK for the uplink data.

That is, the STA wakes up in a period 436, and monitors receipt of the sub MAP frame 410b. Upon receipt of the sub MAP frame 410b, the STA transitions back to the sleep mode and waits until period 438 in a second downlink period 414b indicated by the sub MAP frame 410b. In the period 438, the STA receives the retransmitted data and ACK from the AP. Although not illustrated, it is possible to allocate periods mapped to one or more additional MAP frames before the expiration of the transmission frame period 400.

Figure 5:
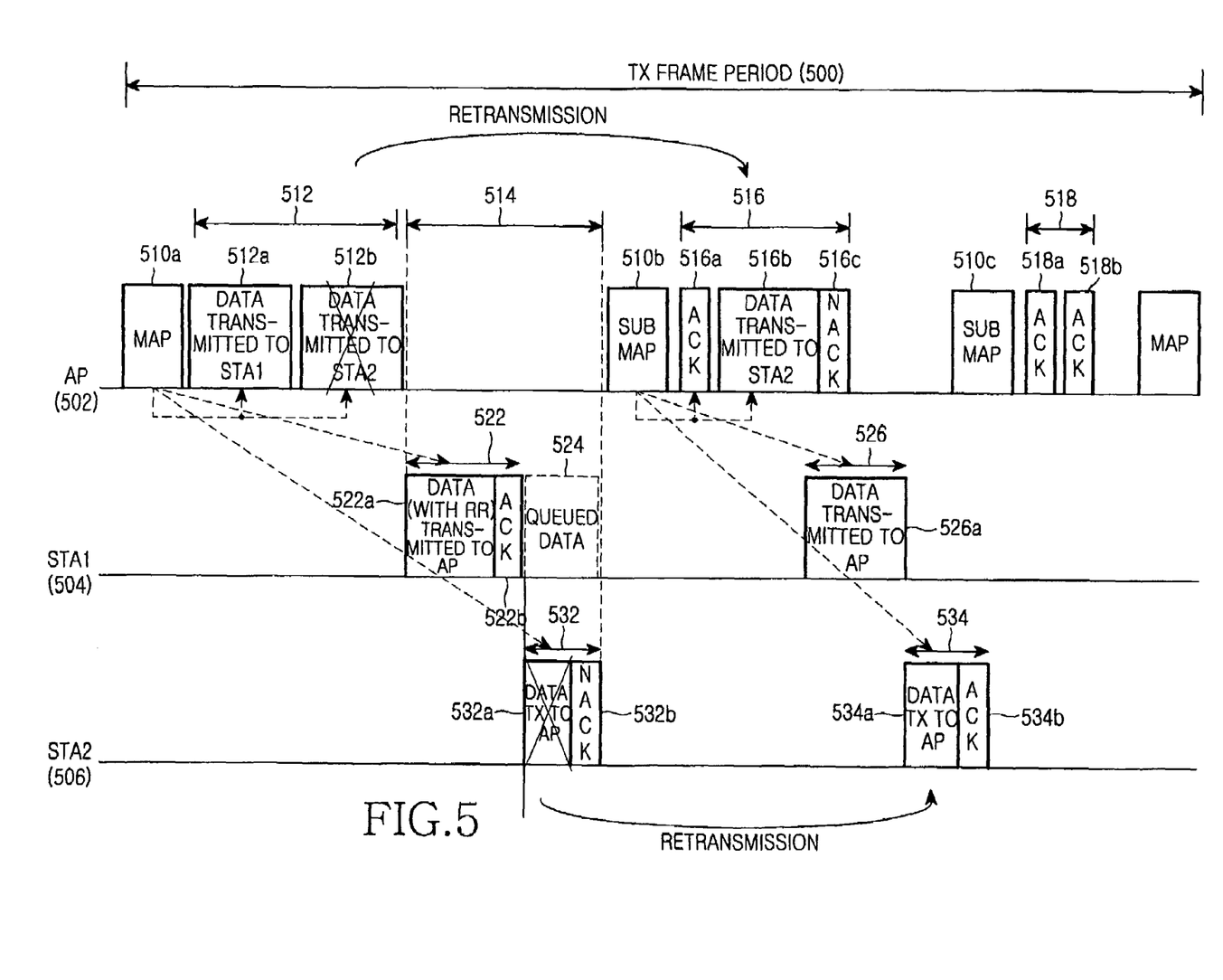
FIG. 5 illustrates an exemplary error recovery operation according to the present invention.

FIG. 5 illustrates an exemplary error recovery operation according to the present invention. Herein, two STAs (STA1) 504 and (STA2) 506 are communicating with each other in service coverage area of an AP 502.

Referring to FIG. 5, the AP 502 transmits a MAP frame 510a at the start of a transmission frame period. The MAP frame 510a provides periods in a first downlink period 512 allocated to the STA1 504 and the STA2 506, and periods in a first uplink period 514 allocated to the STA1 504 and the STA2 506. After transmitting the MAP frame 510*a*, the AP 502 first transmits downlink data 512*a* to the STA1 504, and thereafter, transmits downlink data 512*b* to the STA2 506. Herein, the downlink data 512*b* transmitted to the STA2 506 is partially damaged during transmission.

Upon receipt of the downlink data 512*a* from the AP 502, the STA1 504 transmits uplink data 522*a* and a positive ACK 522*b* for the downlink data 512*a* to the AP 502 in a period 522 of the first uplink period 514 indicated by the MAP frame 510*a*. Here, the STA1 504, as it has remaining queued data 524 left therein, transmits data in the period 522, together with a Resource Request (RR) message for requesting the additional resources required for transmitting the queued data 524.

After receiving the failed downlink data 512*b* from the AP 502, the STA2 506 transmits to the AP 502 uplink data 532*a* and a negative ACK 532*b* for the downlink data 512*b* in a period 532 of the first uplink period 514 indicated by the MAP frame 510. No RR message is sent by the STA2 506 in the period 532 since it did not have any remaining queued data. The uplink data 532*a* originating from the STA2 506 is partially damaged during transmission.

In response to the uplink data 522*a* including the RR message from the STA1 504 and the damaged uplink data 532*a* and the NACK 532*b* from the STA2 506, a sub MAP frame 510*b* indicates an downlink period for an ACK 516*a* to the STA1 504 and retransmission data 516*b* and a NACK 516*c* to the STA2 506 in a second downlink period 516, a period 526 for uplink data 526*a* from the STA1 504, and a period 534 for uplink data 534*a* and an ACK 534*b* from the STA2 506. Therefore, in the periods indicated by the sub MAP frame 510*b*, the AP 502 exchanges data and control message (ACK) with the STAs 504 and 506. That is, if the AP 502 receives a NACK for the downlink data 512*b* transmitted to the STA2 506, or at least fails to receive an ACK, the AP 502 allocates resources for retransmission of the downlink data 512*b* through the sub MAP frame 510*b*.

The AP 502, as it received the uplink data 526*a* and 534*a* from the STAs 504 and 506, allocates a period 518 for transmission of ACKs 518*a* and 518*b* for the uplink data 526*a* and 534*a* through a second sub MAP frame 510*c*. The STAs 504 and 506 receive ACKs 518*a* and 518*b* for the uplink data 526*a* and 534*a* in the period 518 indicated by the second sub MAP frame 510*c*. The MAP frame 310*a*, the first sub MAP frame 510*b*, the second sub MAP frame 510*c*, and all of the downlink and uplink periods associated therewith all occur within one transmission frame period 500.

Figure 6:
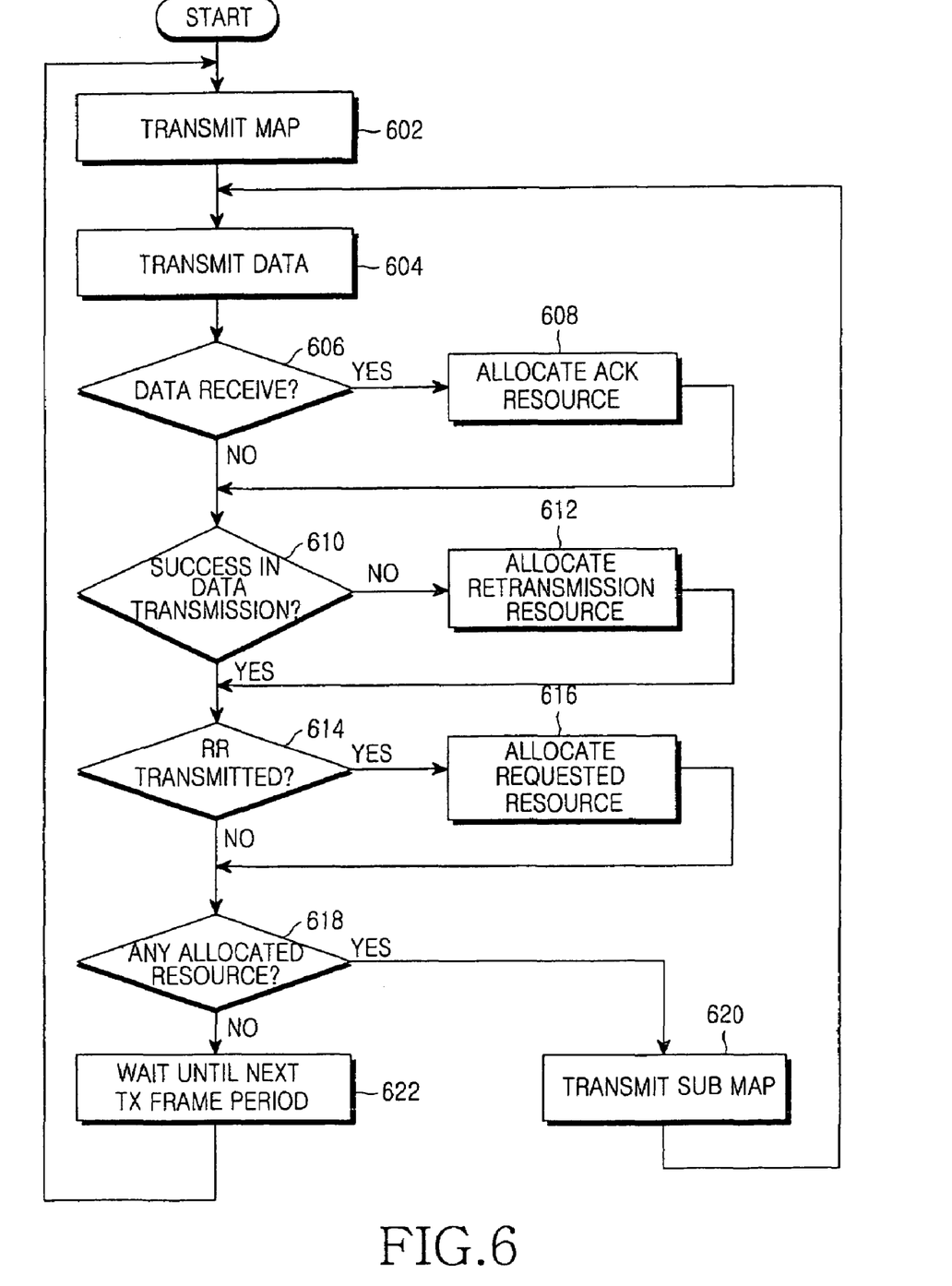
FIG. 6 is a flowchart illustrating an operation of an AP according to the present invention.

FIG. 6 is a flowchart illustrating an operation of an AP according to the present invention. Herein, for simplicity purposes the AP communicates with only one STA.

Referring to FIG. 6, in step 602, the AP initializes the current transmission frame period by transmitting a MAP frame indicating a period allocated to the current transmission frame period. In step 604, the AP transmits downlink data to an STA for a period indicated by the MAP frame. If there is no downlink data to transmit to the STA, the MAP frame includes no downlink period to be allocated to the STA. In this case, step 604 is omitted.

In step 606, the AP determines whether uplink data is received from the STA for the period indicated by the MAP frame. If there is no period allocated to the STA by the MAP frame, the AP proceeds to step 610. However, if uplink data is received from the STA, the AP proceeds to step 608 where it allocates a downlink period for transmission of an ACK for the uplink data, then proceeds to step 610.

In step 610, the AP determines whether an ACK for the downlink data transmitted in step 604 was received in step 606. If the received ACK is a positive ACK, the AP proceeds to step 614. However, if the received ACK is not the positive ACK but a negative NACK, the AP allocates a downlink period for retransmission of the downlink data in step 612, and then proceeds to step 614.

In step 614, the AP determines whether an RR message was received from the STA in step 606. If no RR message was received, the AP proceeds to step 618, determining that there is no need for additional resource allocation in the current transmission frame period. However, if the RR message was received in step 614, the AP allocates a resource, i.e. an uplink period, requested by the RR message in step 616, and then proceeds to step 618.

In step 618, the AP determines whether there is any resource to be additionally allocated in the current transmission frame period. If resource was allocated in any one of steps 608, 612 and 616, the AP proceeds to step 620 where it generates a sub MAP frame indicating the resource allocated in at least one of steps 608, 612 and 616, transmits the sub MAP frame immediately after expiration of the periods indicated by the MAP frame, and then returns to step 604. However, if there is no resource to be additionally allocated in the current transmission frame period, the AP proceeds to step 622 where it waits until a start point of the next transmission frame period, i.e. the next transmission period of the MAP frame, and then returns to step 602.

Figure 7:
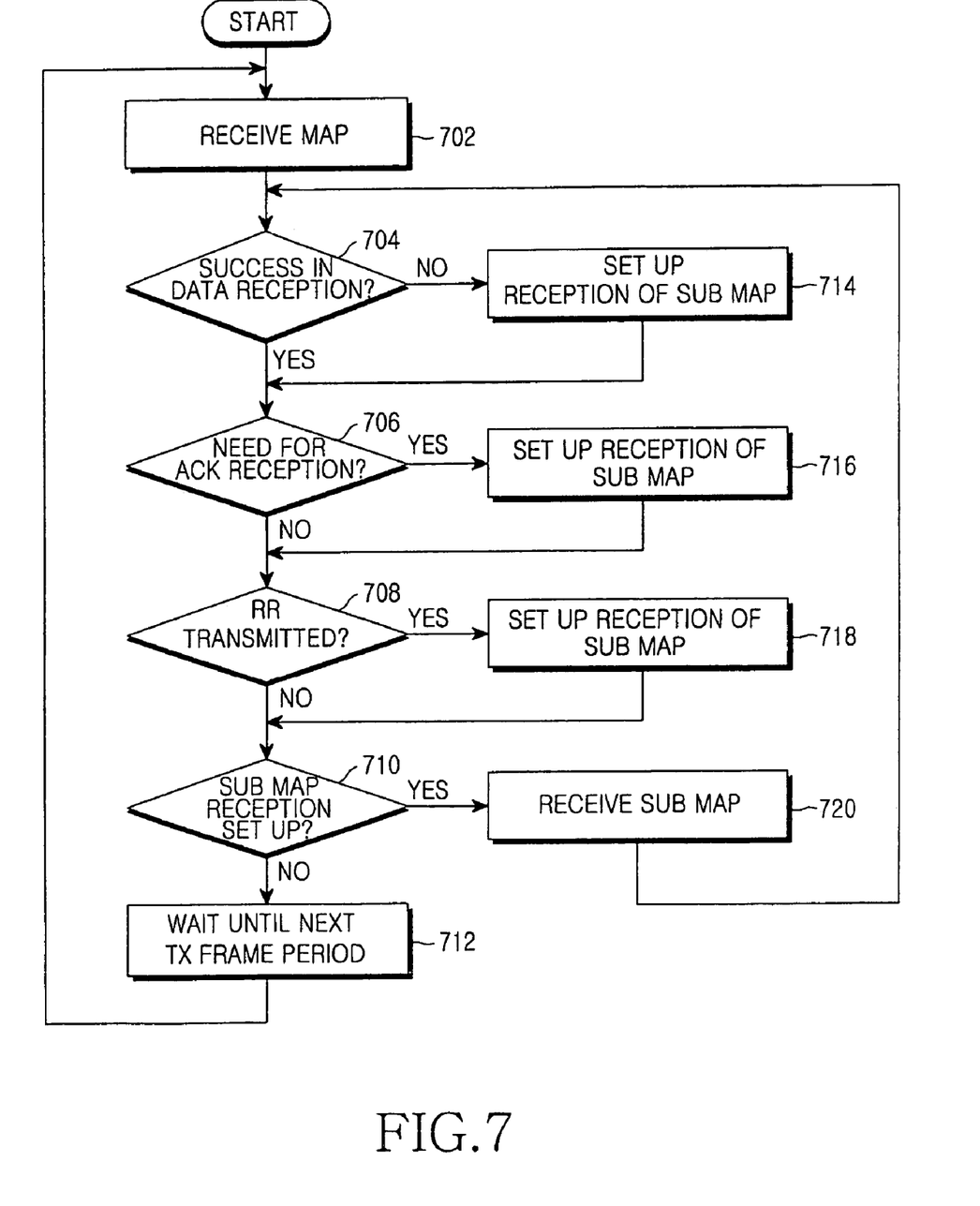
FIG. 7 is a flowchart illustrating an operation of an STA according to the present invention.

FIG. 7 is a flowchart illustrating an operation of an STA according to the present invention.

Referring to FIG. 7, in step 702, the STA, upon receipt of a MAP frame from an AP, recognizes a start of the current transmission frame period and detects a downlink period and/or an uplink period allocated thereto. If the downlink period is indicated by the MAP frame, the STA determines in step 704 whether downlink data was successfully received in the downlink period. If no downlink period is indicated, the STA proceeds to step 706. If the downlink data was not successfully received, the STA proceeds to step 714 where it prepares to receive a sub MAP frame so as to be allocated a downlink period for re-reception of the downlink data, and then proceeds to step 706. Otherwise, the STA directly proceeds to step 706. At this moment, an ACK for the downlink data is transmitted in the succeeding uplink period.

In step 706, the STA determines whether there is a need to receive an ACK for the uplink data transmitted in the uplink period allocated by the MAP frame. If the STA transmitted the uplink data, the STA proceeds to step 716 where prepares to receive a sub MAP frame so as to be allocated a downlink period for reception of an ACK for the uplink data, and then proceeds to step 708. Otherwise, the STA directly proceeds to step 708.

In step 708, the STA determines whether an RR message was transmitted in the uplink period allocated by the MAP frame. If the RR message was transmitted, the STA proceeds to step 718 where it prepares to receive a sub MAP frame so as to be allocated the resource requested by the RR message, and then proceeds to step 710. Otherwise, the STA directly proceeds to step 710.

In step 710, the STA determines whether the reception of the sub MAP frame is set up, i.e. whether it should re-receive downlink data, it should receive an ACK for the uplink data, or it requests additional resources. If the reception of the sub MAP frame is not set up, the STA waits until a start point of the next transmission frame period, i.e. the next transmission period of the MAP frame in step 712, determining that there is no need for additional resources in the current transmission frame period, and then returns to step 702. However, if the reception of the sub MAP frame is set up, the STA proceeds to step 720.

In step 720, the STA monitors reception of the sub MAP frame from the AP immediately after expiration of the full period indicated by the MAP frame. Upon receipt of the sub MAP frame, the STA returns to step 704 and performs the above processes in the succeeding periods indicated by the sub MAP frame.

As can be understood from the foregoing description, the AP allocates only the minimum resources through the first MAP frame to minimize any overestimation of resources, and if the STA has a need for additional resources, the AP immediately allocates through the sub MAP frame the uplink resources that are requested in the same transmission frame period, thereby removing the QoS reduction cause such as the delay and jitter. In addition, the STA maximizes the sleep mode holding time without unnecessarily monitoring the long period, thereby reducing its power consumption.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A wireless network system, comprising:
    an access point (AP) to transmit a first power save multi-poll (PSMP) frame allocating a downlink period and an uplink period, and a subsequent PSMP frame allocating at least one of an additional downlink period and an additional uplink period; and
    a station (STA) to receive data from the AP during the downlink period and transmit data to the AP during the uplink period, and to receive data retransmitted from the AP during the additional downlink period in response to there being data to be retransmitted from the AP and retransmit data to the AP during the additional uplink period in response to there being data to be retransmitted, wherein
    the subsequent PSMP frame is an additional PSMP frame to follow the first PSMP frame in the frame period having periodic duration.

2. The wireless network system of claim 1, wherein the AP transmits to the STA, during the additional downlink period, an acknowledgement (ACK) indicating a reception result of data received during the uplink period indicated by the first PSMP frame.

3. The wireless network system of claim 2, wherein the ACK includes a bitmap indicating the reception result of at least one data unit.

4. The wireless network system of claim 1, wherein the STA receives from the AP, during the additional downlink period, an acknowledgement (ACK) indicating a reception result of data transmitted during the uplink period indicated by the first PSMP frame.

5. The wireless network system of claim 1, wherein the STA transmits to the AP during the uplink period, an acknowledgement (ACK) indicating a reception result of data received during the downlink period.

6. The wireless network system of claim 1, wherein the subsequent PSMP frame provides the additional uplink period for a retransmission of data initially received during the uplink period immediately before transmission of the subsequent PSMP frame.

7. The wireless network system of claim 1, wherein the STA monitors for the subsequent PSMP frame, in response to there being an error in the receipt of downlink data received during the downlink period immediately before a start of the subsequent PSMP frame, or in response to there being uplink data transmitted during the uplink period immediately before the start of the subsequent PSMP frame.

8. The wireless network system of claim 1, wherein the subsequent PSMP frame comprises:
    an identifier (ID) of the STA;
    a start offset indicating a start point of each period provided by the subsequent PSMP frame; and
    a duration field indicating a duration of each period provided by the subsequent PSMP frame.

9. The wireless network system of claim 1, wherein the downlink and uplink periods provided by the first PSMP frame and the at least one of the additional downlink period and the additional uplink period provided by the subsequent PSMP frame are included in one transmission frame period having a fixed length.

10. The wireless network system of claim 1, wherein more than one subsequent PSMP frame is transmitted within one transmission frame period in which the downlink and uplink periods are provided.

11. The wireless network system of claim 1, wherein the subsequent PSMP frame allocates an additional resource to transmit at least one of remaining uplink data and remaining downlink data in response to there being no failed transmission during the downlink period and/or the uplink period.

12. The wireless network system of claim 1, wherein the first PSMP frame comprises:
    an identifier (ID) of the STA;
    a start offset indicating a start point of each period provided by the first PSMP frame; and
    a duration field indicating a duration of each period provided by the first PSMP frame.

13. A wireless network system, comprising:
    an access point (AP) to transmit a first power save multi-poll (PSMP) frame allocating a downlink period and an uplink period, and a subsequent PSMP frame allocating at least one of an additional downlink period and an additional uplink period; and
    a plurality of stations (STAs) to receive data from the AP during the downlink period and transmit data to the AP during the uplink period, and to receive data retransmitted from the AP during the additional downlink period in response to there being data to be retransmitted from the AP and retransmit data to the AP during the additional uplink period in response to there being data to be retransmitted, wherein
    the subsequent PSMP frame is an additional PSMP frame to follow the first PSMP frame in the frame period having periodic duration.

* * * * *